United States Patent [19]
Wilson

[11] 3,836,769
[45] Sept. 17, 1974

[54] RETRACTABLE WALLS

[76] Inventor: Walter Fred Wilson, 133 W. Wilken Way, Barstow, Calif. 92802

[22] Filed: Nov. 9, 1972

[21] Appl. No.: 305,055

[52] U.S. Cl.................................. 296/10, 160/201
[51] Int. Cl............................................. B60p 3/42
[58] Field of Search.................. 296/10, 32, 36, 43; 160/133, 201

[56] References Cited
UNITED STATES PATENTS

| | | | |
|---|---|---|---|
| 1,710,874 | 4/1929 | Hoch | 160/133 |
| 2,231,005 | 2/1941 | Gordon | 160/201 |
| 3,155,419 | 11/1964 | Garson | 296/10 |

*Primary Examiner*—Philip Goodman
*Attorney, Agent, or Firm*—John H. Crowe

[57] ABSTRACT

Retractable side walls for a flat bed semitrailer comprising panels which can be mechanically raised to form the trailer walls, as needed, and subsequently retracted to convert the trailer back into a flat bed vehicle. Each of these panels is flexible enough for rolling around a core drum, to which one end is affixed, and there is a separate core drum for each of the panels rotatably mounted in a housing situated at an edge of the truck bed. This housing has a space for in-and-out movement of the panel to permit lowering and raising of the truck walls. Within the housing, there is a mechanism for causing the panel to unwind from its core drum, or wind onto the drum, when driven by an air impact wrench. Anchored in pockets around the outer edge of the trailer bed are a number of relatively flat upright stakes. The stakes are positioned so that there is one in the space between each pair of adjacent panels. The edges of the stakes have grooves of V-shaped cross section, and the panels have male edges of V-shaped cross section to slide matingly in the grooves of the stakes. The panels are thus guided upwardly, between the stakes, as they are unwound from the core drums, to form the trailer walls.

8 Claims, 12 Drawing Figures

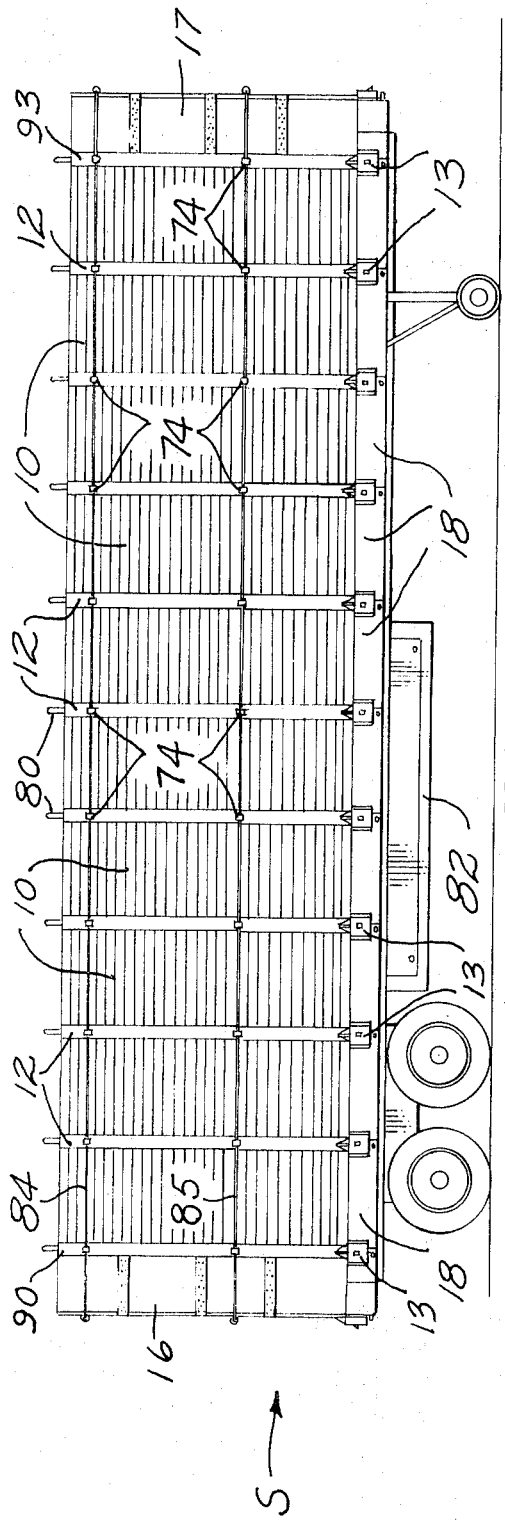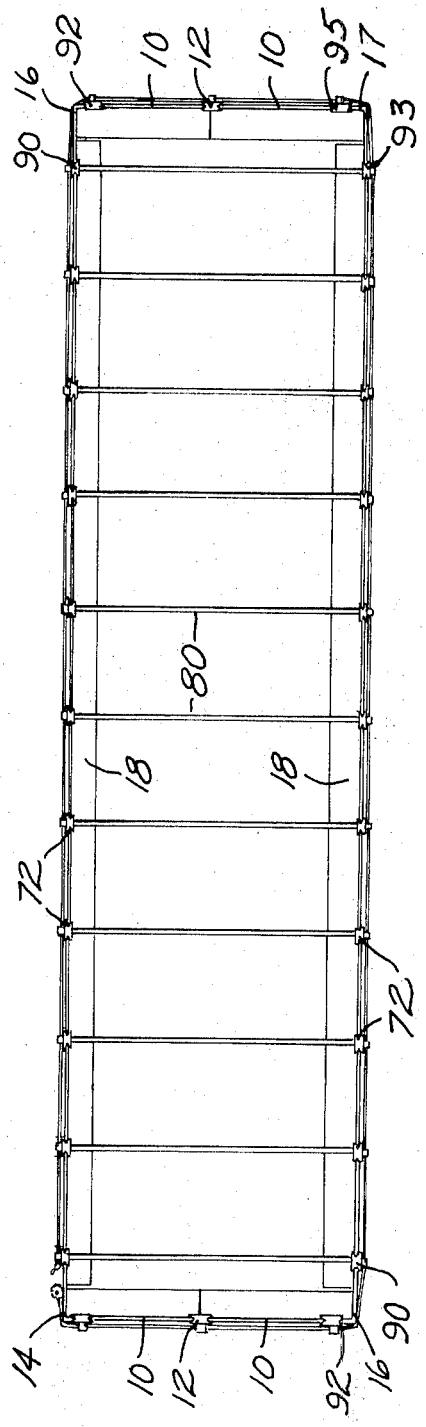

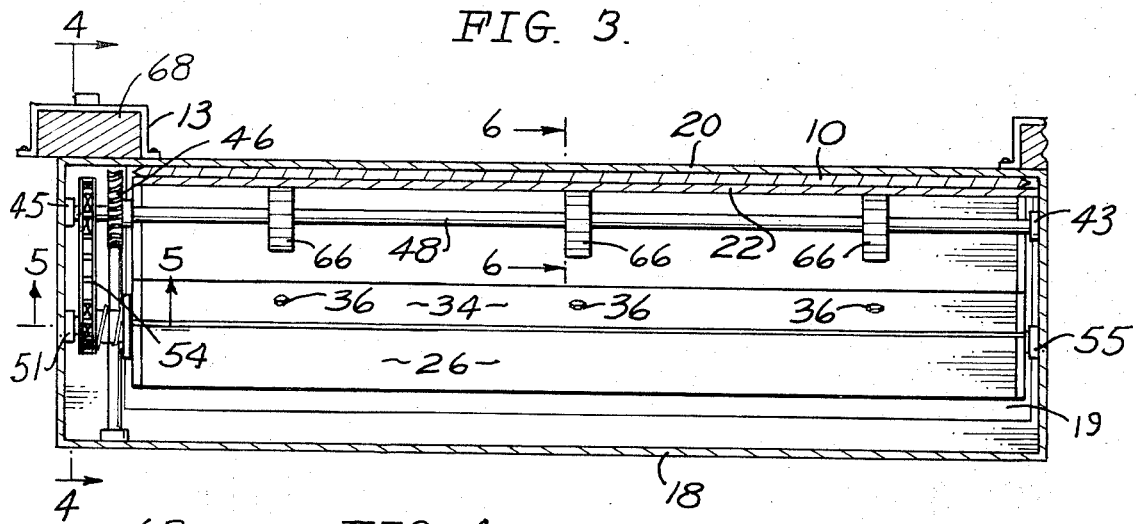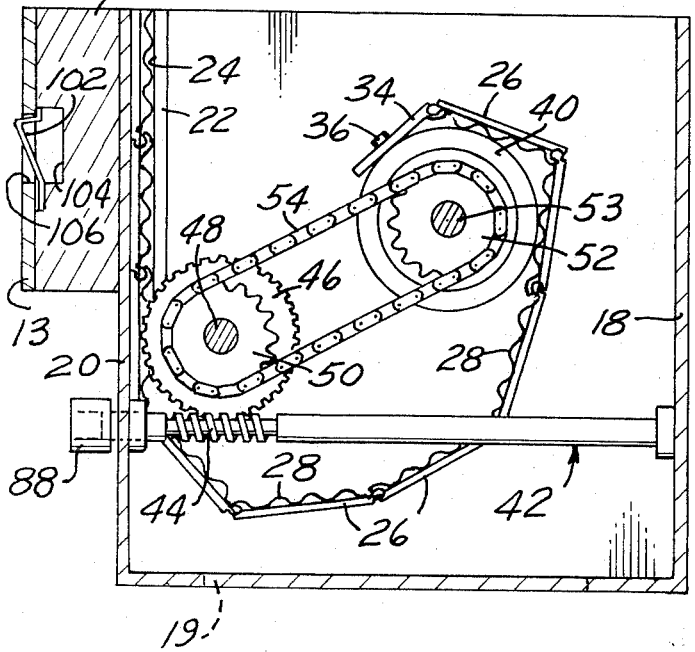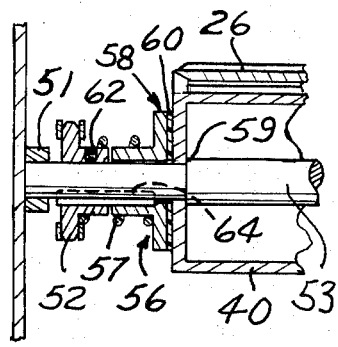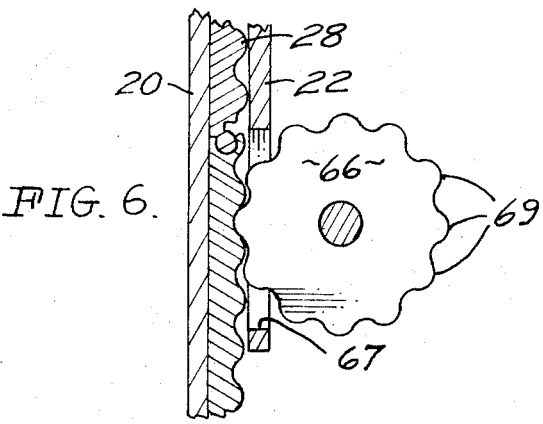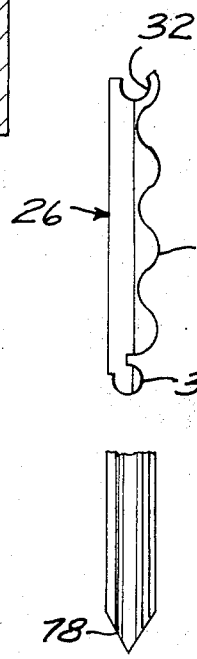

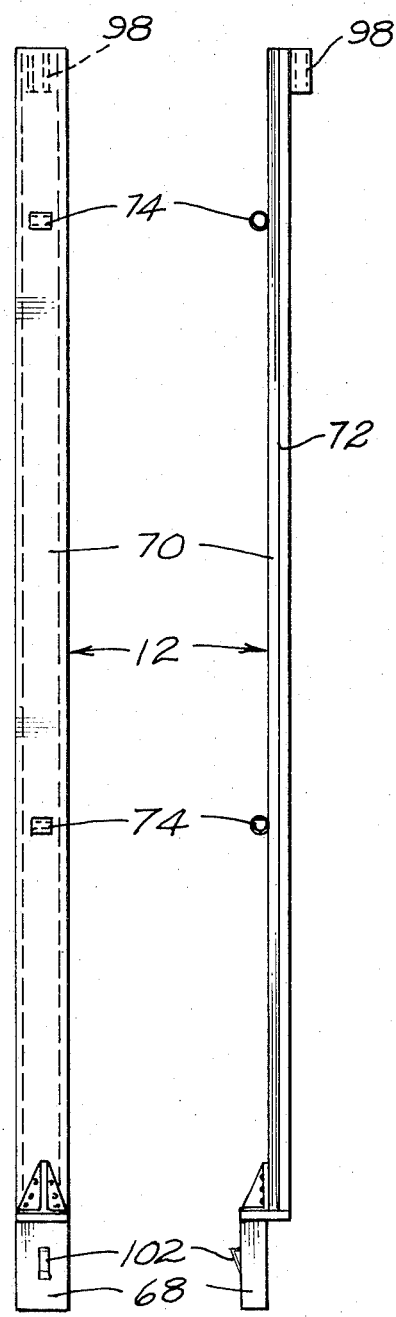
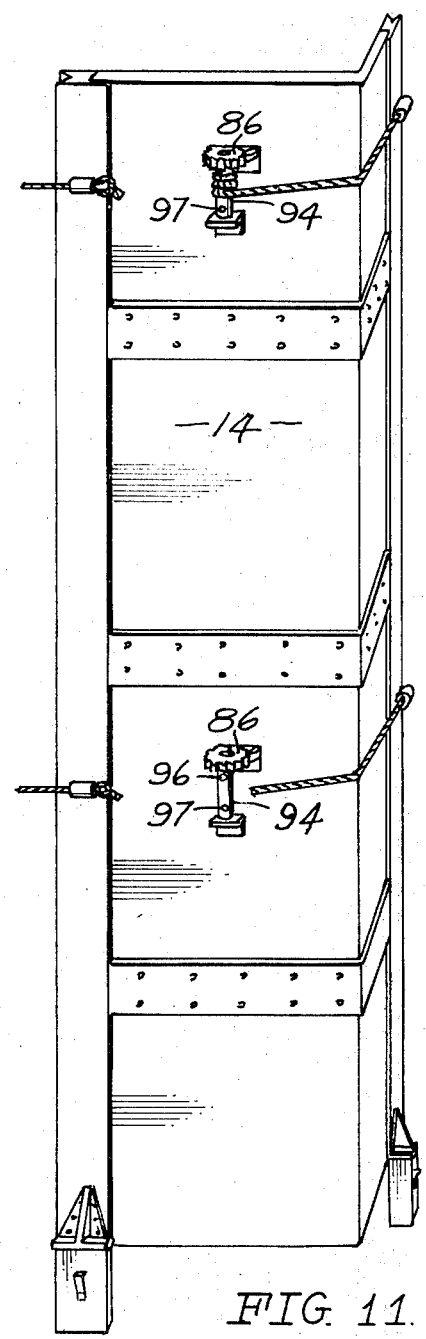
FIG. 9.   FIG. 10.   FIG. 11.
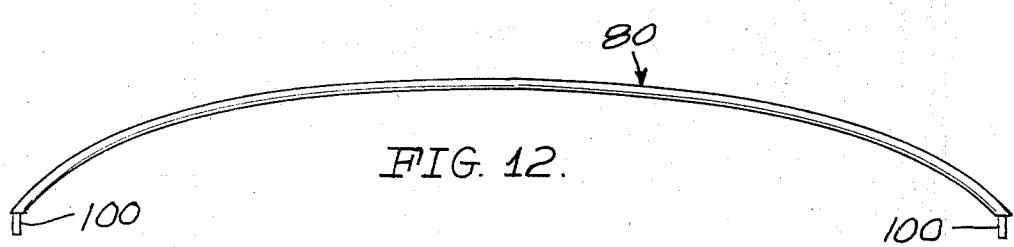
FIG. 12.

RETRACTABLE WALLS

BACKGROUND OF THE INVENTION

This invention relates generally to retractable side walls for semi-trailers, and more particularly to such side walls which roll upwardly, from storage at the floor level of the trailer bed, for use, and are retractable for storage in rolls when no longer needed.

Semitrailers haul freight cargoes of many different types. Some of this freight requires a truck body with full walls, some can be hauled in gondola-type trailers, and some can be hauled on flat bed trucks with no side walls at all. Semitrailers are often employed to haul freight to a destination in one direction, and then pick up a return load for delivery in the opposite direction. Quite often, the nature of the freight on this return load is not known until the truck reaches its first destination. Consequently, there has for some time been a need for an effective means of converting flat bed semitrailers to walled carriers in the field. This need has heretofore been met by the use of temporary wall panels, which can theoretically be installed, and removed when not needed, by drivers and their helpers. The installation of such temporary wall panels is, however, difficult and time consuming. Moreover, the panels, and their cooperating parts, are bulky, and there is little room for storing them on loaded semi-trailers. For this reason, many a driver has discovered, to his dismay, at a time when he is ready to install the side walls, that some of the parts are missing. Thus, the above-mentioned prior art method of furnishing removable side walls for temporary use on semitrailers leaves much to be desired as a practical solution to the problem.

SUMMARY OF THE INVENTION

I have now furnished, in the retractable side walls of this invention, readily available means of converting flat bed trailers to walled trailers with little effort, and just as easily reconverting them to their flat bed forms. This is made possible by means of a plurality of slatted panels hinged along adjacent edges to make them flexible enough to be rolled around a core drum for storage between periods of use, and to be unrolled and directed upwardly to form the trailer walls. These panels of hinged slats are stored in separate housings arranged around the outer edges of the trailer bed. At their outer sides, the housings each have a sandwich wall construction, with a full outer partition, and a partial inner partition (consisting of a flange depending from the top of the housing) and a space therebetween wide enough to permit up-and-down movement of the slatted panels for raising and lowering of the trailer walls. Inside of each housing a slatted panel is secured at its inner end to the wall of a core drum, which is mounted to slip on a suitable shaft. The panel extends from the drum into the space between the partitions of the outer wall of the housing, and then upwardly therethrough. Within the housing, there is a primary drive shaft with a worm gear. This shaft extends outwardly through the wall of the housing and has a female socket for an air impact wrench on its exposed outer end. Meshed with the worm gear, within the housing, is a spur gear mounted on a secondary drive shaft which runs between bearings affixed to the ends of said housing. The secondary drive shaft carries a drive sprocket, and three cogs with corrugated teeth mounted as described below. There is a driven sprocket keyed to the shaft passing through the core drum for each panel roll, and this driven sprocket is in contact with the end of the panel core drum through a slipping clutch.

The panel slats are corrugated on their inner faces, and have mating bead and groove edges that slide together to hold the slats against separation while providing for overall panel flexibility. The three cogs with corrugated teeth are designed to mesh with the corrugations on the panel slats, and are positioned in contact with these slats to help move the panel upwardly when it is being unrolled from its core drum in the below-described manner.

The retractable wall of this invention includes a plurality of relatively flat stakes having edges with grooves of V-shaped cross section. These stakes are mounted in stake pockets around the edge of the flat bed trailer spaced so that each stake is between two adjacent panels. Each of the stakes has an outwardly offset foot which fits into one of these pockets, and a stake segment which extends upwardly in line with the plane of upward travel of the flexible panels. Each of the panels has a V-shaped male edge, sized to fit slidably within one of the V-shaped grooves in the stakes, and the edge and groove are vertically aligned so that the edge travels upwardly within the groove as the panel unwinds.

When a flat bed trailer is fitted with the retractable panels of this invention, the panels are rolled within their housings between periods of use, below the floor surface of the trailer bed, and are not visible. It is a simple matter, however, to convert the trailer into a walled carrier by merely fitting the upright stakes into the side pockets around the trailer bed, and then unwinding each panel by applying an air imact wrench to the wrench fitting on the primary drive shaft for each panel housing. The panels are then forced upwardly, by the combined action of the drive sprockets on the panel core drums, and the turning movement of the cogs with corrugated teeth against the corrugated inner faces of the panels. When it is desired to convert the trailer back into its flat bed state, this procedure is merely reversed.

For best effect, various accessories can be employed conjunctively with the key parts of my retractable wall system described above. For example, structural corner members of some sort are necessary for complete enclosure of the cargo space on the truck. Also, transverse top hoops for the support of a tarpaulin cover can, if desired, be furnished. To brace the wall structure, the upright stakes between the raised panels can be provided with aligned guides through which a cable can be threaded. More than one such cable can be employed, at different vertical levels, and one of the corner structural elements can be provided with a tightening ratchet for each cable by means of which that cable can be tightened.

It is thus a principal object of this invention to provide readily available mechanical means for temporarily converting a flat bed trailer into a walled carrier with minimal effort and difficulty.

It is another object of the invention to provide such means including storage facilities for its functioning components so that the latter are always available when needed.

Other objects, features and advantages of the invention will become apparent to those skilled in the art in the light of subsequent disclosures herein.

BRIEF DESCRIPTION OF THE DRAWINGS

FIG. 1 is a side elevation of a flat bed semitrailer, with a preferred form of retractable wall enclosure in accordance with this invention in a fully extended position of use thereon.

FIG. 2 is a top view of the FIG. 1 trailer.

FIG. 3 is an enlarged sectional view of one of a plurality of enclosed drive units for the retractable wall enclosure, looking down from a cutting plane just below the top of the enclosure for the unit.

FIG. 4 is an enlarged cross-sectional view of the FIG. 3 drive unit, and the foot portion of an upright stake forming a component of the wall enclosure, taken along line 4—4 of FIG. 3.

FIG. 5 is a still further enlarged fragmentary view, mostly in section, of an important mechanical part of the unit, taken along line 5—5 of FIG. 3.

FIG. 6 is an enlarged fragmentary cross-sectional view of a key part of the unit, taken along line 6—6 of FIG. 3.

FIG. 7 is an end view of one of the slats forming a flexible wall panel in accordance with this invention as part of the retractable wall enclosure.

FIG. 8 is a fragmentary top view of the FIG. 7 slat, showing it to have a V-shaped edge configuration.

FIG. 9 is an enlarged front view of an upright stake forming an important component part of the rectractable wall enclosure.

FIG. 10 is a side view of the upright stake.

FIG. 11 is a perspective view of a corner structure forming a part of the illustrated wall enclosure, fitted with a ratchet means for tightening a pair of cables around said enclosure.

FIG. 12 is an enlarged elevation of a top hoop designed to fit transversely across the top of the wall enclosure.

DESCRIPTION OF THE PREFERRED EMBODIMENT

Considering now the drawings in greater detail, with emphasis first on FIGS. 1 and 2, there is shown a flat bed semitrailer S fitted with a plurality of flexible wall panels 10, adjustable between positions of extension, in which they form wall segments around the trailer bed as illustrated in FIG. 1, and retracted positions, in which they are rolled in panel housings 18 of rectangular cross section disposed end-to-end around the outer edges of the trailer bed. Each of the panel housings 18 has an outer wall of sandwich construction, consisting of an outer partition 20, extending upwardly from the bottom of the housing, and an inner flange 22 extending downwardly from the top of the housing, separated by a space 24 wide enough to receive one of the wall panels in loosely sliding relationship, all as illustrated in FIG. 4. Each of the panels 10 is assembled from a plurality of individual slats 26, preferably, but not necessarily, of extruded aluminum construction. Each of the slats 26 has a bead 30 along its lower edge, and a receptive hollow 32 along its upper edge. The slats are fitted together by sliding the lower bead of one into the hollow of another of the slats, the fit being such as to permit flexible rolling of the panel around a core drum for storage between periods of extension, such a drum being shown at 40 in FIGS. 4 and 5. Panel 10 has an end strip 34 flexibly attached to an adjacent slat 26, as illustrated, and the end strip is fastened to the core drum by means of three bolts 36 (see FIG. 3). The inner faces of the slats comprising panel 10 are corrugated, as shown at 28, for reasons hereinafter explained.

Mounted transversely within each of the panel housings 18, near one end, is a primary drive shaft 42 having worm gear 44 hear its outer end. Meshed with worm gear 44 is a spur gear 46 fixedly secured to a secondary drive shaft 48. Secondary drive shaft 48 is disposed lengthwise of the panel housing and rotatably mounted in a pair of bearings 43 and 45 affixed to the inner surfaces of the end walls of the panel housing in the manner shown in FIG. 3. Mounted between the spur gear 47 and bearing 45 on the secondary drive shaft 48 is a drive sprocket 50. The core drum 40 is mounted to slip on a shaft 53, which extends between a pair of bearings 51 and 55 affixed to the ends of panel housing 18, parallel to the secondary drive shaft 48. Fixedly secured to the core drum shaft 53, by means of a set screw 62, is a sprocket 52. Sprocket 52 is in alignment with sprocket 50, the same size as the latter, and drivingly connected therewith by means of a chain 54.

Sprocket 52, hereinafter referred to as driven sprocket 52, has a clutch 56, keyed to the core drum shaft 53 by means of a key (not shown) disposed in a slot 64 in the core drum shaft to permit it to slide longitudinally, for a limited distance, along the shaft, but not slip around it. Clutch 56 has a clutch plate 58, faced with a layer of suitable wear resistant material 60, such as, for example, an automotive clutch plate facing material, which is held in contact with the adjacent end of core drum 40 by means of a suitable spring 57. The purpose of this clutch is to permit slippage of the core drum when it would otherwise turn at a speed too great to accomodate a moving panel being fed thereto from elsewhere in the system, as will be explained.

The flange 22 forming the inner partition of the outer "sandwich" wall of the housing 18 terminates short of the floor of the housing (to allow room thereunder for the passage of a panel 10 - see FIG. 4), and has three appropriately located slots 67 (see FIG. 7) through which three gears 66 extend. These gears are mounted in spaced arrangement along the secondary drive shaft 48 (see FIG. 3), and have corrugated teeth 69 around their peripheries (see FIG. 6). These corrugated teeth are designed to mesh with the corrugations 28 on the inner face of panel 10, in the manner illustrated in FIG. 6, for a reason hereinafter appearing.

Each of the primary (worm gear) drive shafts 42 extends outwardly through the outer wall of the panel housing in which it is mounted, and has an integral female socket 88 for an air impact wrench at its outer end. The wall panels are driven upwardly, to their extended positions, by power from such a wrench, acting through gears 66 and driven sprocket 52 on the panel and its core drum, respectively. Thus, when the worm gear 44 is driven in such direction as to impart clockwise movement to each of the gears 66 (as seen in FIG. 6) the gears drive the panel upwardly, to its extended, truck wall, position. It will be apparent that during this panel unrolling operation, the peripheral speed of the panel leaving core drum 40 will exceed the speed of the panel passing gears 66. Consequently, the housing 18 is provided with a bottom opening 19 to accomodate the slack in the panel which would otherwise jam the apparatus by packing in the bottom of the housing. To reroll the panel on core drum 40 (and thereby retract it from its extended wall position), it is only necessary to turn worm gear 44 in the reverse direction (so as to rotate gears 66 counterclockwise), again by applying an air impact wrench to socket 88 on the primary drive shaft 42. During this operation, the disparity between the speed of the panel passing gears 66 and that at the outer periphery of the roll of panel on the core drum is compensated for by permissible slippage between facing 60 of clutch plate 58 and the end of core drum 40 with which it is in contact. A shoulder 59 on shaft 53 serves as a limit stop for core drum 40 to permit the necessarily tight contact between clutch 56 and the core drum for proper operation of the apparatus.

As FIG. 1 makes clear, a plurality of upright stakes 12 are positioned between adjacent panels 10 along the side walls of the trailer bed. This is made possible by the provision of a plurality of stake pockets 13 affixed to the outer walls of the housings 18 at properly spaced intervals to receive the stakes between the panels. Each of the stakes is of relatively narrow, flat form, with an outwardly offset foot segment 68, which fits into a pocket 13, and an inwardly offset stake segment 70 extending upwardly from the top of said foot segment, having V-shaped slots 72 (see FIGS. 2 and 10) in its edges. The stakes are fitted with two rows of aligned cable guides 74. These cable guides are simply small sections of pipe properly sized to receive a pair of cables threaded therethrough as will be described in greater detail below. The two sets of cable guides are vertically spaced to permit effective tightening of the trailer walls with two cable bands stretching all the way around the walled enclosure of the truck body.

The outer edges of the panels 10 terminate in V-shaped configurations, as illustrated at 78 in FIG. 8, which fit slidably within the V-shaped channels 72 in the edges of upright stakes 12. Thus, as each panel is unwound, it moves upwardly so that its V-shaped edges ride inside the V-shaped grooves in the facing edges of a pair of flanking stakes, until the panel is fully unwound. This provides interfit of the edges of the panels with the edges of adjacent stakes, so that all of the panels are aligned and interlocked with the stakes to form a continuous truck wall. While the panels must be separately powered by an air impact wrench to their extended positions, this is a fairly quick and simple operation for a man with such a wrench. Where more than one man is available, as is usually the case, the job can be done even faster.

To provide bracing for the truck walls, three of the corners of the flat bed semitrailer are fitted with removable corner structures 16 and 17, which are simply dihedral segments of wall structure each with a pair of integrally affixed stakes at its side edges, the corner structure 16 stakes being shown at 90 and 92 and the corner structure 17 stakes at 93 and 95, in FIGS. 1 and 2 of the drawings. These stakes are somewhat similar to stakes 12, but differ from the latter in having only one edge with a V-shaped groove to receive the edge of a panel 10. The fourth corner of the trailer is fitted with a corner structure 14, similar to structures 16, except that it is provided with a pair of pawl-and-ratchet tightening devices 86, having ratchet shafts 94 with two openings 96 and 97. Opening 96 is adapted to receive the loose end of a cable stretching around the illustrated wall enclosure (see FIG. 11) and opening 97 is adapted to receive a rod by means of which the ratchet can be tightened to draw the cable taut. A pair of cables so stretched and tightened around the trailer walls is shown at 84 and 85 on FIG. 1.

Each of the upright stakes 12 has a tubular socket 98 affixed to its upper end, on its inner side. These sockets are axially parallel to the stakes, and sized to snugly receive the downwardly extending pins 100 at the ends of a plurality of top hoops 80 (see FIG. 12), which serve to brace the wall structure and, more importantly, provide a frame for a tarpaulin, or other covering, for the truck body.

The flat bed trailer S is provided with a compartment 82 mounted beneath its floor between the housings at the sides of the trailer bed. This compartment is for the storage of stakes 12, top hoops 80, and corner structures 14, 16 and 17, between periods of use, so those parts will always be available when needed.

It should be noted that each end of semitrailer S is fitted with a pair of housings 18 to permit its enclosure by two panels 10 when the truck walls are in their extended position of use. These end panels are secured between a center stake 12 and the edge stake of a corner structure 14, 16 or 17, depending upon its location.

While the novel retractable semitrailer wall means of this invention have been herein illustrated and described in what are considered to be preferred embodiments, there are, as will be appreciated, many variations of these embodiments within the scope of the invention. Certain of these variations have already been mentioned, and others will occur to those skilled in the art in the light of present teachings. For example, a trailer could be provided with shortened upright stakes for use between the panels where gondola-type, rather than full height, wall enclosures are preferred. Other examples of permissible variations result when noncritical changes are made in the shapes of various parts, or features, of the illustrated wall system (such as, for example, changing gears 66 to gears of conventional square-tooth form and providing panels with inner surfaces designed to mesh with such gears rather than the corrugated inner surfaces of panels 10); equivalent materials of construction are substituted for the preferred materials mentioned above; certain structural, or other, features of the wall means not critically essential to its use and functioning are eliminated; useful, but noncritical hardware, or other, items are incorporated in the illustrated wall means; etc.

The foot member of each upright stake 12 has a spring-loaded catch 102 mounted over a hollow 104 in its outer face, as best illustrated in FIG. 4. This catch is designed to fit within a receptive slot 106 properly positioned for that purpose in each pocket 13, again as best illustrated in FIG. 4. It will be apparent that when the foot member is inserted in the pocket, spring catch 102 snaps into a locking position in slot 106 to hold the stake firmly in position.

While this disclosure has emphasized the use of my novel wall means for flat bed trailers, it will be understood that the invention is not necessarily limited to this use, and can be employed in any capacity for which its unique character suits it. Also, the wall means of this invention can, of course, be designed for actuation by force other than from an air impact wrench, within the scope of my invention. In summary, the scope of the present invention extends to all variant forms thereof encompassed by the language of the following claims.

I claim:

1. Retractable wall means primarily suitable for use in providing temporary walls for flat-bed trailers, comprising:

a plurality of panels, each panel being flexible enough for rolling around a core but of transversely rigid character and comprising a plurality of slats arranged with side edges adjacent and pivotally joined to render said panel flexible;

rotatable core means including a core for each of said panels and means rotatably supporting same;

holding means for anchoring one end of each of said panels to said core so that the panel winds around said core when the latter is rotated in the proper direction to permit this;

panel actuating means associated with each of said panels and said rotatable core means, said panel actuating means serving to urge the panel away from its core and in an upward direction for wall forming purposes, or downward and around said core for wall retracting purposes, when a properly directed powering force is applied thereto; and receiving and guiding means for receiving and guiding the edges of each of said panels to hold the panel straight and guide it, when it is being moved upwardly for wall forming purposes, or downwardly for wall retracting purposes;

said retractable wall means including a plurality of housings for said panels, each at least partially enclosing a separate one of said rotatable core means and its associated panel actuating means, said housings being adapted for installation at the edges of a flat-bed trailer, the outer wall of each of said housings having an outer and an inner partition, separated by a space, the inner partition depending partway to the bottom from the top of said housing;

each flexible panel being wound on a separate one of the cores so that its leading edge unrolls to thread under the inner partition, and then upwardly through the space separating the inner and outer partitions of said outer wall of one of said housings, to upward extension therefrom for trailer wall formation when said panel is being moved upwardly for wall forming purposes;

the receiving and guiding means for said panels comprising a plurality of stakes positionable around the edges of the bed of said flat-bed trailer so that their side edges engage the side edges of adjacent panels and help guide these panels upwardly as said panels are being unwound from their cores for wall forming purposes, the edges of said stakes and said panels being shaped for sliding interfit so that the stakes and panels remain engaged as the panels are rolled upwardly or downwardly by said panel actuating means.

2. Retractable wall means in accordance with claim 1 in which the edges of the stakes and panels are of V-shaped cross section, the stakes having female, and the panels male, edge configurations, to permit said sliding interfit.

3. Retractable wall means in accordance with claim 1 in which each of said panels has an inner surface with transverse ridges and grooves and in which said panel actuating means comprises a primary drive shaft, a secondary drive shaft connected through gear means to said primary drive shaft, sprocket drive means operative from said secondary drive shaft for rotating said core, gear drive means mounted on said secondary drive shaft and positioned and adapted to mesh with the ridges and grooves of said inner surface of said panel where the latter extends upwardly into the hollow space in the front wall of said housing, so as to impart upward driving force to the panel when said panel actuating means is powered to unwind said panel from said core, and slip drive means associated with said core adapted to permit slippage of the core on said means rotatably supporting same when said panel actuating means is powered to wind said panel onto said core and the panel take up speed of the core would otherwise exceed the speed with which the panel is being fed to said core.

4. Retractable wall means in accordance with claim 3 in which said primary drive shaft is a shaft having a worm gear around a portion of its length and a socket for an air impact wrench at one end; said gear means connecting the secondary and primary drive shafts comprises a spur gear mounted on the secondary drive shaft in meshing relationship with said worm gear; said sprocket means comprises a drive sprocket mounted on said secondary drive shaft in coactive relation with said spur gear, a driven sprocket positioned to turn said core when driven by said drive sprocket, except when the core is permitted to slip by said slip drive means, and a drive chain interconnecting the drive and driven sprockets for the transmission of power from the former to the latter.

5. Retractable wall means in accordance with claim 4 in which said panel is made up of slats of extruded material having corrugated inner surfaces and in which said gear drive means mounted on said secondary drive shaft comprises a plurality of laterally spaced gears which turn coaxially with said spur gear.

6. Retractable wall means in accordance with claim 2 in which said stakes between which the panels are disposed in their unwound positions have feet which fit snugly into pockets extending outwardly from the outer walls of said housings, when the latter are installed at the edges of said flat bed trailer, and in which said feet have snap fasteners adapted to fit through openings in the walls of said pockets to hold the stakes firmly in position in the pockets.

7. Retractable wall means in accordance with claim 6 in which said stakes have cable guides secured to their outer surfaces, said cable guides being positioned to receive cable means in encirclement of the trailer walls for wall bracing purposes.

8. Retractable wall means in accordance with claim 7 including corner members for the trailer walls, each comprising a dihedral structure with a pair of stake members connected to its side edges, each of said stake members having an outer edge adapted to engage an edge of one of said panels similarly to the way the edges of said stakes engage the edges of the panels.

* * * * *

UNITED STATES PATENT OFFICE
CERTIFICATE OF CORRECTION

Patent No. 3,836,769            Dated September 17, 1974

Inventor(s) Walter Fred Wilson

It is certified that error appears in the above-identified patent and that said Letters Patent are hereby corrected as shown below:

On the cover page, in the address of the inventor, "Barstow" should read --Anaheim--.

Signed and sealed this 17th day of December 1974.

(SEAL)
Attest:

McCOY M. GIBSON JR.        C. MARSHALL DANN
Attesting Officer           Commissioner of Patents